United States Patent
Ullah et al.

(10) Patent No.: US 11,906,539 B2
(45) Date of Patent: Feb. 20, 2024

(54) PENDULAR ACCELEROMETER SENSOR WITH CONDITIONAL CAPACITIVE DETECTION

(71) Applicant: SAFRAN ELECTRONICS & DEFENSE, Paris (FR)

(72) Inventors: Philippe Ullah, Moissy-Cramayel (FR); Vincent Ragot, Moissy-Cramayel (FR); Nicolas Bigourie, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 120 days.

(21) Appl. No.: 17/785,615

(22) PCT Filed: Dec. 10, 2020

(86) PCT No.: PCT/EP2020/085564
§ 371 (c)(1),
(2) Date: Jun. 15, 2022

(87) PCT Pub. No.: WO2021/122320
PCT Pub. Date: Jun. 24, 2021

(65) Prior Publication Data
US 2023/0026178 A1    Jan. 26, 2023

(30) Foreign Application Priority Data
Dec. 20, 2019    (FR) ...................................... 1915319

(51) Int. Cl.
*G01P 15/125*    (2006.01)
*G01P 15/13*    (2006.01)

(52) U.S. Cl.
CPC .......... *G01P 15/125* (2013.01); *G01P 15/131* (2013.01)

(58) Field of Classification Search
CPC ...................................................... G01P 15/125
(Continued)

(56) References Cited

U.S. PATENT DOCUMENTS 10,866,261 B2 *    12/2020    Ragot ................... G01P 15/125

FOREIGN PATENT DOCUMENTS

FR    2 916 855 A1    12/2008
WO    2014/128027 A1    8/2014

OTHER PUBLICATIONS

English translation of Written Opinion dated Mar. 2, 2021, issued in corresponding International Application No. PCT/EP2020/085564, filed Dec. 10, 2020, 6 pages.
(Continued)

*Primary Examiner* — Walter L Lindsay, Jr.
*Assistant Examiner* — Philip T Fadul
(74) *Attorney, Agent, or Firm* — CHRISTENSEN O'CONNOR JOHNSON KINDNESS PLLC

(57) ABSTRACT

An accelerometer sensor includes a casing, a pendulum fixed to the casing, a movable electrode carried by the pendulum and connected to a detection circuit, a first electrode and a second electrode rigidly attached to the casing to form, with the moving electrode, two capacitors of variable capacitance depending on a distance between the electrodes. The accelerometer sensor further includes a control unit that carries out detection operations to measure the variable capacitances of the capacitors. The control unit also performs a control operation of the movable electrode depending on the capacitances measured by applying a logic signal for controlling a switch for selective connection of the fixed electrodes to an excitation circuit delivering a control signal to the fixed electrodes in order to keep the pendulum in a predetermined position.

9 Claims, 3 Drawing Sheets

Figure 1:
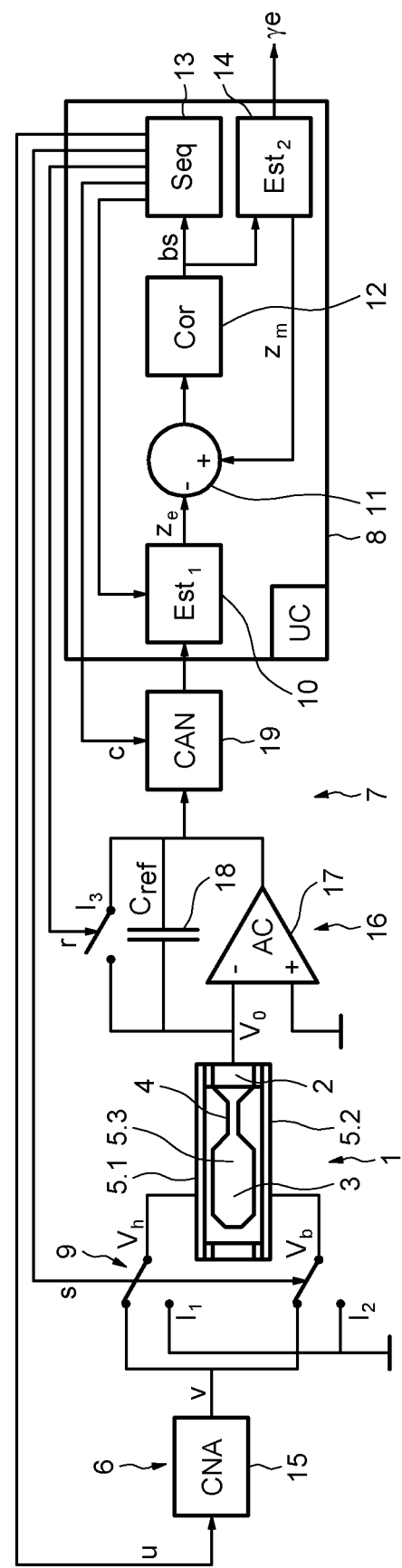

(58) Field of Classification Search
USPC .................................................... 73/514.32
See application file for complete search history.

(56) References Cited

OTHER PUBLICATIONS

International Preliminary Report on Patentability dated May 17, 2022, issued in corresponding International Application No. PCT/EP2020/085564, filed Dec. 10, 2020, 7 pages.
International Search Report dated Mar. 2, 2021, issued in corresponding International Application No. PCT/EP2020/085564, filed Dec. 10, 2020, 5 pages.
Written Opinion dated Mar. 2, 2021, issued in corresponding International Application No. PCT/EP2020/085564, filed Dec. 10, 2020, 6 pages.

* cited by examiner

PENDULAR ACCELEROMETER SENSOR WITH CONDITIONAL CAPACITIVE DETECTION

The present invention relates to a closed-loop pendular accelerometer sensor with electrostatic control and detection, used for the detection of physical quantities, and a method for controlling such a sensor. The sensor is for example a MEMS (Micro Electro Mechanical Systems) technology sensor.

An electrostatic pendular accelerometer comprises a casing and a seismic mass connected to the casing by one or more hinges positioned such that the seismic mass forms a pendulum movable relative to the casing, either in translation or in rotation. The movements of the seismic mass under the effect of acceleration are generally detected by means of three electrodes.

A first fixed electrode and a second fixed electrode are integral with the casing and connected to a drive circuit.

The third electrode, which is movable, is carried by the pendulum and connected to a detection circuit.

Each fixed electrode forms with the movable electrode a capacitance whose value depends on their spacing. In the absence of a manufacturing defect and when the sensor is not subjected to an acceleration along its sensitive axis, the pendulum remains in its neutral position wherein the two capacitances are equal. On the other hand, when the pendulum is subjected to an acceleration along its sensitive axis, it moves, causing a consecutive decrease in the capacitance formed by the movable electrode and one of the fixed electrodes, and an increase in the capacitance formed by the movable electrode and the other fixed electrode.

This capacitance variation also depends on the deformations of the casing and of the pendulum.

In closed-loop operation, the position of the pendulum is servo-controlled in a neutral position, or target position, halfway between the fixed electrodes, by applying to the pendulum an electrostatic force which must compensate for the acceleration applied along the sensitive axis. The electrostatic force is the result of voltages applied to the electrodes to keep the capacitance difference at zero.

The sensor comprises a drive circuit for each fixed electrode, arranged to power-supply the electrodes so as to generate said electrostatic force.

The quadratic character of the electrostatic force with respect to the applied voltages complicates the design of the control circuit performing the servo-control of the pendulum and the estimation of the acceleration.

To circumvent this difficulty, it is known to control the pendulum in all or nothing using calibrated voltage pulses.

These pulses are applied to either one of the electrodes depending on whether it is a question of pulling or pushing the pendulum to bring it back to its target position. The density of pulses intended to push, respectively to pull the pendulum, that is to say the amount of pulses per time interval, is then an affine function of the acceleration to be measured.

Thus, zero acceleration is compensated by an equal number, on average, of pulses in both directions.

However, the symmetry of the pulses applied to the two electrodes may be imperfect due to a difference between the duration of the pulses applied to the first fixed electrode and the duration of the pulses applied to the second fixed electrode.

In this case, the pulse density is modified by the servo-control to keep the pendulum in the target position, which biases the estimate of the acceleration.

In order to improve the performance of this type of sensor, it has been proposed, in document WO 2014/128027, to use a common drive circuit, thus limiting the problems of manufacturing asymmetry and ageing of the electronics of the drive circuit.

It has also been proposed, in document WO 2017/85142, to implement a fine control phase to send moderate control pulses allowing to obtain optimal performance over a reduced measurement range, and an extended operating control phase, wherein high amplitude control pulses are sent to extend the measurement range, to bias the sensor at full scale, with possibly degraded performance.

Although advantageous in many respects, the aforementioned sensors have a relatively high power consumption.

In view of the foregoing, the purpose of the invention is to provide an electrostatic pendular accelerometer sensor having reduced electrical consumption, while maintaining improved performance.

Another purpose of the invention is moreover to propose such a sensor having a simple implementation structure.

The invention thus proposes an accelerometer sensor, comprising a casing, a pendulum fixed to the casing, a movable electrode carried by the pendulum and connected to a detection circuit, fixed first electrode and second electrode integral with the casing to form, with the moving electrode, two capacitors of variable capacitance depending on a distance between the electrodes, and a control unit configured to perform detection operations to measure the variable capacitances of the capacitors and a control operation of the movable electrode depending on the capacitances measured by applying a logic signal for controlling a switch for selective connection of the fixed electrodes to a drive circuit delivering a control signal to the fixed electrodes to keep the pendulum in a predetermined position.

The control unit is configured to apply, at each calibration period, a first detection signal at one of said fixed electrodes chosen according to the logic level of the control signal and a second detection signal at the other fixed electrode, the control signal being applied to the electrode to which the second detection signal is applied.

Thus, the reduction of sensor consumption and the improvement of performance are obtained by reducing the number of switchings of the switch, by applying two detection signals and a control signal.

According to another feature, the first and second detection signals are signals in the form of a slot.

According to yet another feature, the switch comprises a first input terminal at a reference potential provided by the drive circuit and a second input terminal at a zero potential to selectively connect said fixed electrodes to the drive circuit or to the zero potential.

In one embodiment, the drive circuit comprises a digital-to-analogue converter connected to the switch and controlled by the control unit.

The detection circuit may include an amplifier stage having an input connected to the movable electrode and an output connected to an analogue-to-digital converter having an output connected to the control unit.

For example, the control unit includes a first pendulum position estimator connected at the input to the output of the detection circuit and an output connected to the negative input of a comparator having an output connected to an input of a corrector having an output connected to a sequencer and to a second estimator having a first output connected to the positive input of the comparator and a second output providing an estimate of the acceleration.

In one embodiment, the control unit is configured to apply the second detection signal and the control signal by means of a common detection and control pulse.

The object of the invention is also a method for controlling an accelerometer sensor as defined above, comprising the steps of:

- detecting the variable capacitances of the capacitors by applying at each calibration period a first detection signal at one of the fixed electrodes chosen according to the logic level of the control signal and a second detection signal at the other fixed electrode;
- controlling the movable electrode depending on the capacitances measured by applying a logic signal for controlling a switch for selective connection of the fixed electrodes to a drive circuit delivering a control signal so as to apply the control signal to the electrode to which the second detection signal is applied.

According to this method, the second detection signal and the control signal are advantageously applied by means of a common detection and control pulse.

Other purposes, features and advantages of the invention will appear upon reading the following description, given only by way of non-limiting example, and made with reference to the appended drawings wherein:

FIG. 1 is a schematic view of a sensor according to one embodiment of the invention;

FIG. 2 and

Figure 3:
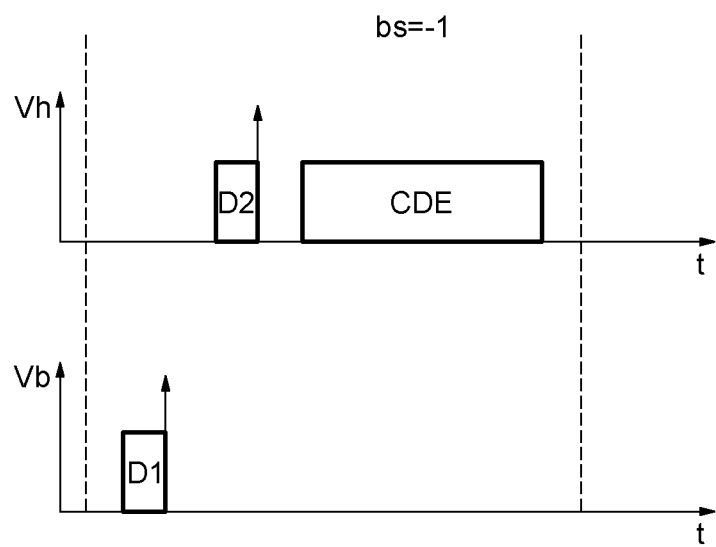
Figure 4:
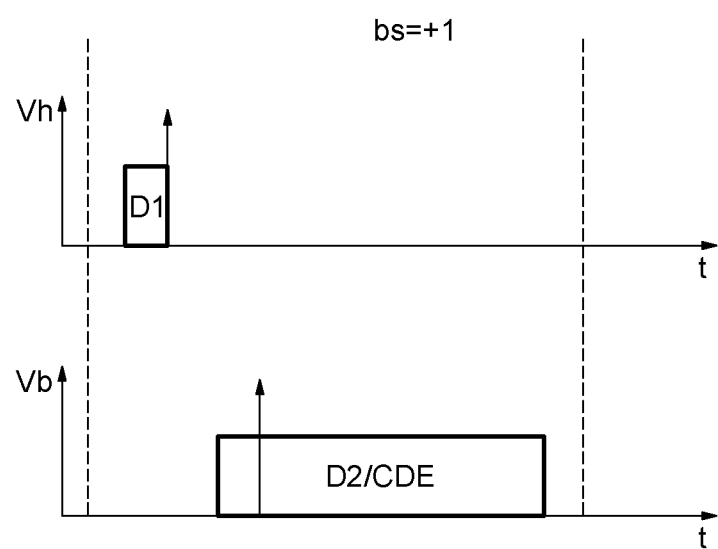

FIG. 3 are timing diagrams showing the application of the first and second detection signals and of the control signal to the fixed electrodes according to the logic level of the control signal; and FIG. 4 is a timing diagram illustrating another embodiment of the invention wherein the detection signal applied to the controlled electrode and the control signal are applied by means of a common detection and control pulse.

FIG. 1 shows an accelerometer sensor in accordance with the invention, designated by the general reference numeral 1.

The accelerometer sensor here is a microelectromechanical system, also called MEMS, by etching a plate of crystalline or semi-crystalline material, such as silicon.

The sensor comprises a casing 2 to which a solid body 3 is articulated by means of a hinge 4 positioned in such a way that the solid body 3 forms a movable pendulum with respect to the casing 2 according to a pivoting movement.

The sensor 1 comprises a first fixed electrode 5.1 and a second fixed electrode 5.2 which are integral with the casing and which are connected to a drive circuit designated by the reference 6, and a third electrode 5.3 carried by the solid body 3 is connected to a detection circuit 7. A control unit 8 is connected to the drive circuit 6 and to the detection circuit 7.

The drive circuit 6 includes an output connected to a switch 9 with two positions connected to the first electrode 5.1 and to the second electrode 5.2 to selectively connect them to the drive circuit 6.

More specifically, the switch 9 comprises a switch 11 arranged to connect the first electrode 5.1 either to the output of the drive circuit 6 or to ground and a switch 12 arranged to connect the second electrode 5.2 either to the output of the drive circuit 6 or to ground.

The switch 9 is controlled by control unit 8.

The control unit 8 comprises a first estimator 10 connected at the input to the detection circuit 7 and an output connected to a negative input of a comparator 11 having an output connected to an input of a corrector 12 whose output is connected to a sequencer 13.

The control unit 8 further comprises a second estimator 14 having an input connected to the output of the corrector 12, an output connected to the additive input of the comparator 11 and an output providing the estimate of the acceleration $\gamma e$.

Moreover, the drive circuit 6 comprises a digital-to-analogue converter 15 connected to the switch 9 and controlled by the control unit 8.

The detection circuit 7 comprises a main amplifier stage 16 including a charge amplifier 17 equipped with a loop capacitor 18 of capacitance Cref and a switch $I_3$.

The amplifier stage has an input connected to the movable electrode 5.3 and an output connected to an input of an analogue-to-digital converter 19 having an output connected to the first estimator 10 of the control unit.

This sensor operates as follows.

The control unit 8 manages the operation of the sensor and in particular the chronology of the various operations calibrated at a frequency FS. The sequencer 13 sequences the operations within the calibration periods Ts, by sequentially and cyclically controlling the digital-to-analogue converter 15 by a control u, the analogue switches $I_1$, $I_2$ by a control s, the analogue-to-digital converter 19 by a control c and the analogue switch 13 by a control r.

According to the logic state of the control s, one of electrodes 5.1, 5.2 is connected to the output V of the digital-to-analogue converter 15 while the other electrode 5.2, 5.1 is simultaneously connected to ground. The electrode connected to the output of the converter is thus positioned at the reference potential provided by the drive circuit 6.

The accelerometer sensor is controlled by the control unit so as to implement, at each calibration period TS, a phase of detecting the variable capacitances Ch and Cb formed between the first fixed electrode 5.1 and the movable electrode 5.3 and between the second fixed electrode 5.2 and the movable electrode 5.3, respectively, and a control phase wherein an excitation signal is applied at one of the fixed electrodes so as to return the pendulum to its target position thanks to the electrostatic force applied to the plates of the capacitor whose fixed electrode has been selected by the control s. At the end of the detection phase, the corrector 10 determines the sign of a logic control signal bs in order to determine whether the control signal u must be applied to the fixed electrode 5.1 or to the fixed electrode 5.2

If bs=+1, the voltage is applied to the electrode 5.2 which then pulls the pendulum towards it.

If bs=−1, the voltage is applied to the electrode 5.1 which then pulls the pendulum towards it.

The detection of capacitances is performed conditionally, according to the sign of the control signal bs, the chronological order of the detections being determined by the sign of bs.

The linearised expression of the capacitance of the first fixed electrode called "high" fixed electrode $C_h$ and of the second fixed electrode called "low" fixed electrode $C_h$ is given by the following relations:

$$C_h(z) = C_0 - C_1 \cdot \frac{z}{e} \qquad \text{(eq. 1)}$$

$$C_b(z) = C_0 + C_1 \cdot \frac{z}{e} \qquad \text{(eq. 2)}$$

And the relative position of the pendulum is given by the relation:

$$\varepsilon_z = \frac{z}{e} = \frac{C_b - C_h}{2 \cdot C_1} = \frac{Q_b - Q_h}{2 \cdot C_1 \cdot V_{ref}} \quad \text{(eq. 3)}$$

wherein $C_0$ denotes the initial capacitance, $C_1$ denotes the active capacitance, z is the position of the pendulum, e the width of the air gap, that is to say the distance between the electrodes 5.1 and 5.3 or between the electrodes 5.2 and 5.3, which are equal at rest, $V_{ref}$ is the reference voltage supplied by the analogue-to-digital converter 15 and applied to the electrodes and $Q_b$ and $Q_h$ are the charges transferred to the detection circuit 7, which correspond to the charge variations at the terminals of the variable capacitors subjected to a voltage rising edge ranging from 0 to Vref.

Thus, for each calibration period, during the detection phase, two capacitive readings are implemented to estimate the position of the pendulum and power-supply the corrector.

Within a calibration period, the position of the pendulum varies little between the two measurements.

The detection of the variable capacitances is a conditional detection, the order of the capacitive detection being conditioned on the sign of the logic control signal bs coming from the corrector 12. A pseudo-random permutation of the order of the detections is therefore performed, the permutation being pseudo-random because of the properties of the control signal bs in a sigma delta type loop which are those of a white noise filtered by a high-pass transfer function determined in particular by the corrector 12.

The first detection is performed on the uncontrolled electrode, and the second is implemented on the electrode which is going to be controlled, the control logic signal being available from the start of the real time period because its calculation is launched as soon as the detections made during the previous calibration period are available.

Figure 2:
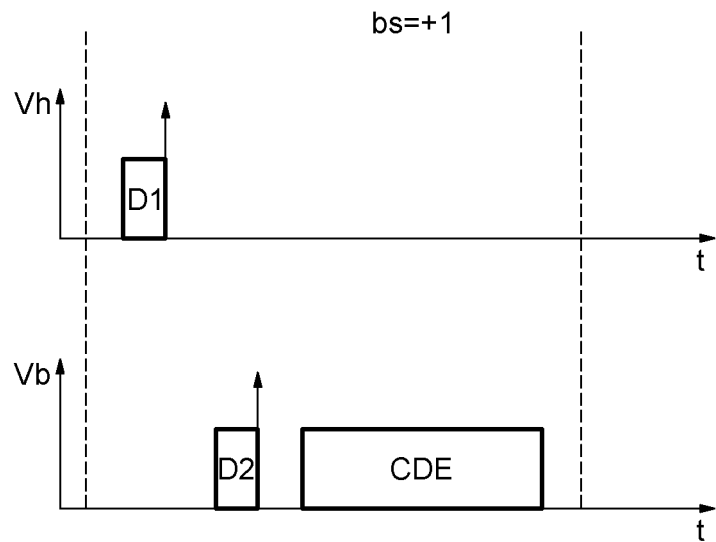

With reference to FIG. 2, for example, when bs=+1, a first detection D1 is implemented for the high electrode 5.1 by application of a read pulse, then a second detection D2 is implemented on the low electrode by applying a second measurement pulse.

A control pulse is then supplied to the low electrode Vb by controlling the switch 9.

With reference to FIG. 3, in the case where bs=−1, the pulse detection order is reversed.

This conditional detection allows to limit the number of switchings of the switch 9 and consequently to reduce consumption, the control being applied directly to the electrode to be controlled. Indeed, it is no longer necessary to operate the switch 9 which remains in the same state between the detection phase D2 and the control phase.

It should also be noted that the order of the detections is permuted at high frequency. The biases of electronic origin generated by the control pulses are thus transformed into noise due to the pseudo-random nature of the controls.

Indeed, any detection bias generates noise with a spectral appearance identical to that of the pulsed control signal bs. Thanks to conditional detection, the biases are greatly reduced, by being multiplied by the mean value of the control signal bs, only the noises remaining, for which the tolerances are increased.

Thus, conditional detection becomes pseudo-random both for the parasitic force it exerts and for the position measurement itself.

Moreover, whereas in the prior art the detection pulses were periodic and their spectrum consisted of lines, the permutation has a spectral spreading effect, which allows to limit the excitation of high-frequency parasitic modes and, above all, to regulate this excitation by the control, which becomes permanent and slowly variable or, in other words, less singular in frequency.

Moreover, with reference to FIG. 4, according to another aspect, the second capacitive detection pulse and the control pulse form a common detection and control pulse.

In other words, the rising edge of the control signal is shifted to coincide with the falling edge of the second detection signal.

This implementation allows to perform the capacitive detection and control by means of the same pulse signal.

The electrostatic force applied to the pendulum, the direction of which is decided by the control signal bs, is constituted by the difference between the force exerted by the detection and control pulse and by the first detection signal applied to the other electrode.

The detection is performed by means of the carrier of the detection and control signal, while the control is performed in the baseband.

This implementation still allows, theoretically, to reduce consumption by one third, by reducing the switchings of the switch 9.

Likewise, a one-third reduction in the bias error due to the waveforms, which depends on the number of pulses during the calibration period, is obtained.

Finally, the scale factor error due to waveforms is completely removed.

Indeed, the acceleration equivalent to the applied force is written:

$$\overline{y} = \frac{C_1}{2 \cdot e \cdot m} \cdot \left( \sigma_b^2 - \sigma_h^2 \right) \quad \text{(eq. 4)}$$

with: $C_1$ the active capacitance, e the width of the air gap, m the mass of the pendulum, and σh² and σb² the mean square of the voltages applied to the high and low electrodes at each calibration period.

In an implementation with three detection and control pulses, the force applied was written:

$$\overline{y} = \frac{C_1}{2 \cdot e \cdot m} \cdot \left( \sigma_{db}^2 - \sigma_{dh}^2 + \frac{\sigma_{cb}^2 - \sigma_{ch}^2}{2} + \frac{\sigma_{cb}^2 + \sigma_{ch}^2}{2} \cdot bs \right) \quad \text{(eq. 5)}$$

wherein $$\sigma_{db}^2 - \sigma_{dh}^2 + \frac{\sigma_{cb}^2 - \sigma_{ch}^2}{2}$$

corresponds to the bias and $$\frac{\sigma_{cb}^2 - \sigma_{ch}^2}{2}$$

corresponds to the scale factor.

By implementing a first detection pulse and a second detection and control pulse, the force applied is written:

$$\overline{y} = \frac{C_1}{2 \cdot e \cdot m} \cdot \left( \frac{\sigma_{db}^2 - \sigma_{dh}^2 + \sigma_{cb}^2 - \sigma_{ch}^2}{2} + \frac{\sigma_{cb}^2 + \sigma_{ch}^2 - \sigma_{db}^2 - \sigma_{dh}^2}{2} \cdot bs \right) \quad \text{(eq. 6)}$$

Assuming that the time constants are short compared to the duration of the pulses, any waveform fault σerr² will have the same effect whether it is on a detection pulse or a control pulse, superimposing to the theoretical mean square.

By noting $\varepsilon_t$ the asymmetrical part of this defect, we have:

$$\sigma_{db}^2 = \sigma_{d,th}^2 + (1+\varepsilon_t) \cdot \sigma_{err}^2 \quad \text{(eq. 7a)}$$

$$\sigma_{dh}^2 = \sigma_{d,th}^2 + (1-\varepsilon_t) \cdot \sigma_{err}^2 \quad \text{(eq. 7b)}$$

$$\sigma_{cb}^2 = \sigma_{c,th}^2 + (1-\varepsilon_t) \cdot \sigma_{err}^2 \quad \text{(eq. 7c)}$$

$$\sigma_{cb}^2 = \sigma_{c,th}^2 + (1-\varepsilon_t) \cdot \sigma_{err}^2 \quad \text{(eq. 7d)}$$

In a three-pulse implementation, we obtain:

$$\overline{y} = \frac{C_1}{2 \cdot e \cdot m} \cdot \left( 3 \cdot \varepsilon_t \cdot \sigma_{err}^2 - \left( \sigma_{c,th}^2 + \sigma_{err}^2 \right) \cdot bs \right) \quad \text{(eq. 8)}$$

wherein $3.\varepsilon_t.\sigma_{err}^2$ corresponds to the bias and $(\sigma_{c,th}^2 + \sigma_{err}^2)$ corresponds to the scale factor.

With a two-pulse implementation, we have:

$$\overline{y} = \frac{C_1}{2 \cdot e \cdot m} \cdot \left( 2 \cdot \varepsilon_t \cdot \sigma_{err}^2 + \left( \sigma_{c,th}^2 - \sigma_{d,th}^2 \right) \cdot bs \right) \quad \text{(eq 9)}$$

wherein $2.\varepsilon_t.\sigma_{err}^2$ corresponds to the bias and $(\sigma_{c,th}^2 + \sigma_{d,th}^2)$ corresponds to the scale factor.

It is therefore seen that the error caused by the control pulse is compensated by the error caused by the detection pulse.

The scale factor error is eliminated and should no longer be taken into account during preliminary calibration phases and which could be significant at certain operating temperatures and during sensor ageing.

The invention claimed is:

1. An accelerometer sensor, comprising a casing, a pendulum fixed to the casing, a movable electrode carried by the pendulum and connected to a detection circuit, fixed first electrode and second electrode integral with the casing to form, with the moving electrode, two capacitors of variable capacitance depending on a distance between the electrodes, and a control unit configured to perform detection operations to measure the variable capacitances of the capacitors and a control operation of the movable electrode depending on the capacitances measured by applying a logic signal that controls a switch for selective connection of the fixed electrodes to a drive circuit delivering a control signal to the fixed electrodes to keep the pendulum in a predetermined position, wherein the control unit is configured to apply, at each calibration period, a first detection signal at one of said fixed electrodes chosen according to a logic level of the control signal, and a second detection signal at the other fixed electrode, the control signal being applied to the electrode at which the second detection signal is applied.

2. The sensor according to claim 1, wherein the first and the second detection signals are signals in the form of a square wave.

3. The sensor according to claim 1, wherein the switch comprises a first input terminal at a reference potential provided by the drive circuit, and a second input terminal at a zero potential to selectively connect said electrodes to the drive circuit or to the zero potential.

4. The sensor according to claim 1, wherein the drive circuit comprises a digital-to-analogue converter connected to the switch and controlled by the control unit.

5. The sensor according to claim 1, wherein the detection circuit includes an amplifier stage having an input connected to the movable electrode and an output connected to a digital-to-analogue converter having an output connected to the control unit.

6. The sensor according to claim 1, wherein the control unit includes a first pendulum position estimator connected at the input to the output of the detection circuit and an output connected to the negative input of a comparator having an output connected to an input of a corrector having an output connected to a sequencer and to a second estimator having a first output connected to the positive input of the comparator and a second output providing an estimate of the acceleration.

7. The sensor according to claim 1, wherein the control unit is configured to apply the second detection signal and the control signal by means of a common detection and control pulse.

8. A method for controlling an accelerometer sensor according to claim 1, comprising the steps of:
    detecting the variable capacitances of the capacitors by applying at each calibration period a first detection signal at one of the fixed electrodes chosen according to the logic level of the control signal and a second detection signal at the other fixed electrode;
    controlling the movable electrode depending on the capacitances measured by applying a logic signal for controlling a switch for selective connection of the fixed electrodes to a drive circuit delivering a control signal so as to apply the control signal to the electrode to which the second detection logic signal is applied.

9. The method according to claim 8, wherein the second detection signal and the control signal are applied by means of a common detection and control pulse.

* * * * *